United States Patent [19]
Bright et al.

[11] Patent Number: 5,205,516
[45] Date of Patent: Apr. 27, 1993

[54] CANOPY OR COVER ASSEMBLIES AND PIVOT ARRANGEMENTS

[75] Inventors: Frederick A. Bright, Preston; Christopher R. Hoare, Kingston-upon-Thames, both of United Kingdom

[73] Assignee: British Aerospace Public Limited Company, London, England

[21] Appl. No.: 642,211

[22] Filed: Jan. 16, 1991

[30] Foreign Application Priority Data

Jan. 16, 1990 [GB] United Kingdom ............... 9000951

[51] Int. Cl.⁵ .............................................. B64C 1/14
[52] U.S. Cl. ................................ 244/121; 244/122 AF
[58] Field of Search .................... 244/121, 122, 129.1, 244/129.4, 129.5; 16/357–361, 364; 49/381, 394

[56] References Cited

U.S. PATENT DOCUMENTS

| | | |
|---|---|---|
| 2,673,050 | 3/1954 | Patch et al. |
| 2,832,553 | 4/1958 | Wallenhorst ............. 244/121 |
| 2,970,793 | 2/1961 | Beem et al. ............. 244/121 |
| 4,524,485 | 6/1985 | Harris ..................... 16/364 |

FOREIGN PATENT DOCUMENTS

| | | |
|---|---|---|
| 8812332 | 12/1988 | Fed. Rep. of Germany. |
| 1118654 | 6/1956 | France. |
| 568413 | 4/1945 | United Kingdom. |

*Primary Examiner*—Galen Barefoot
*Attorney, Agent, or Firm*—Young & Thompson

[57] ABSTRACT

An assembly for hinging a canopy to a fuselage includes a hinge with a floating hinge axis which accommodates differential thermal expansion of the canopy and the fuselage.

8 Claims, 11 Drawing Sheets

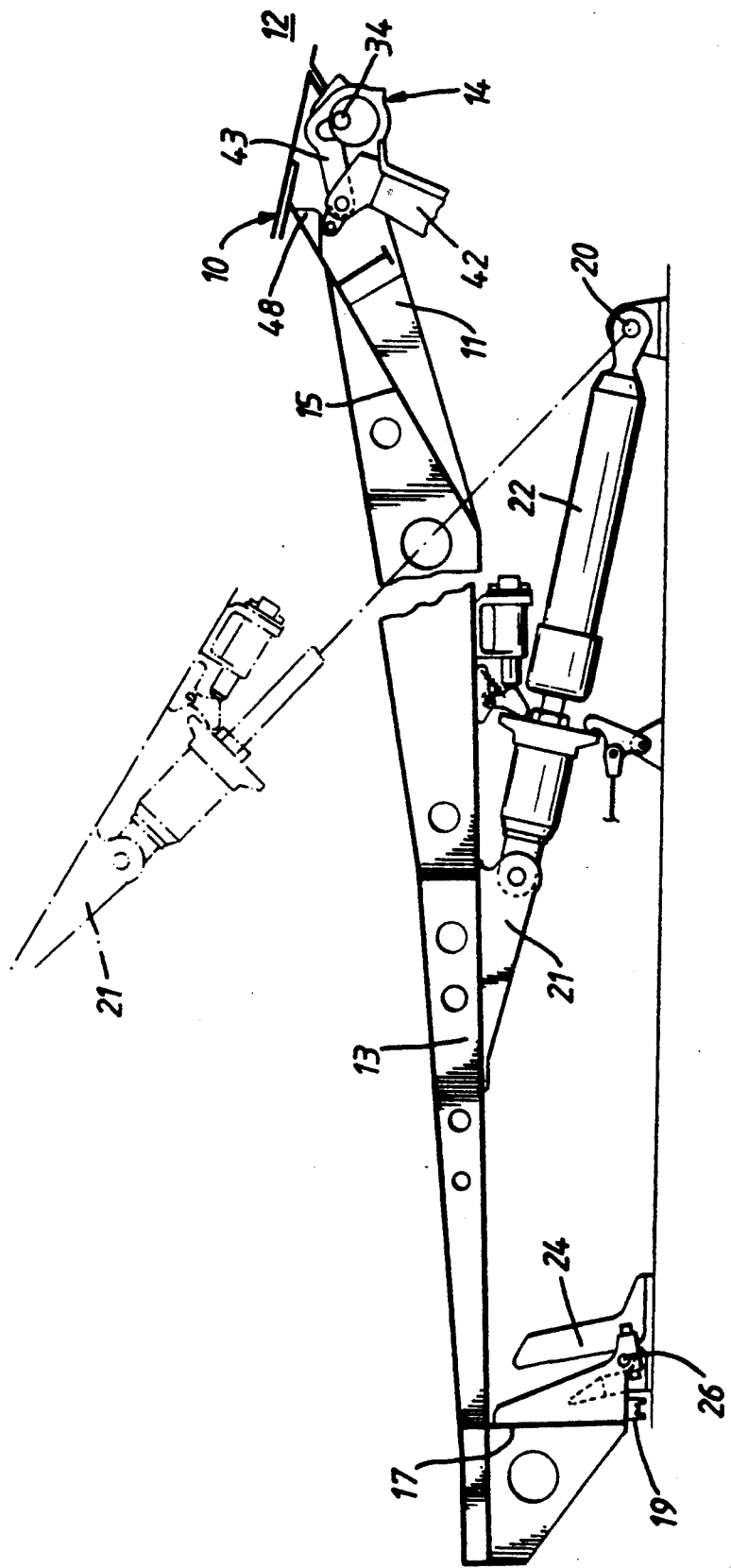

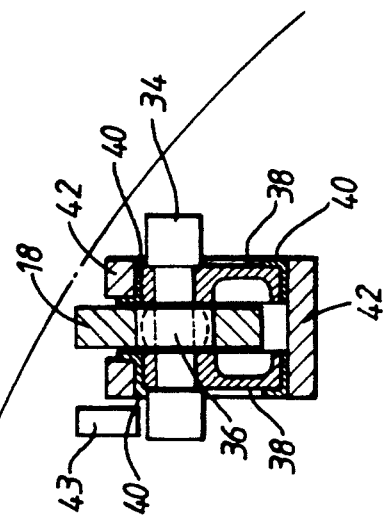
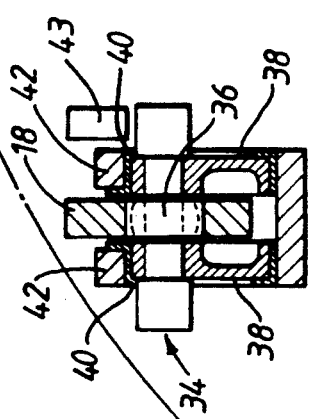
Fig. 4.

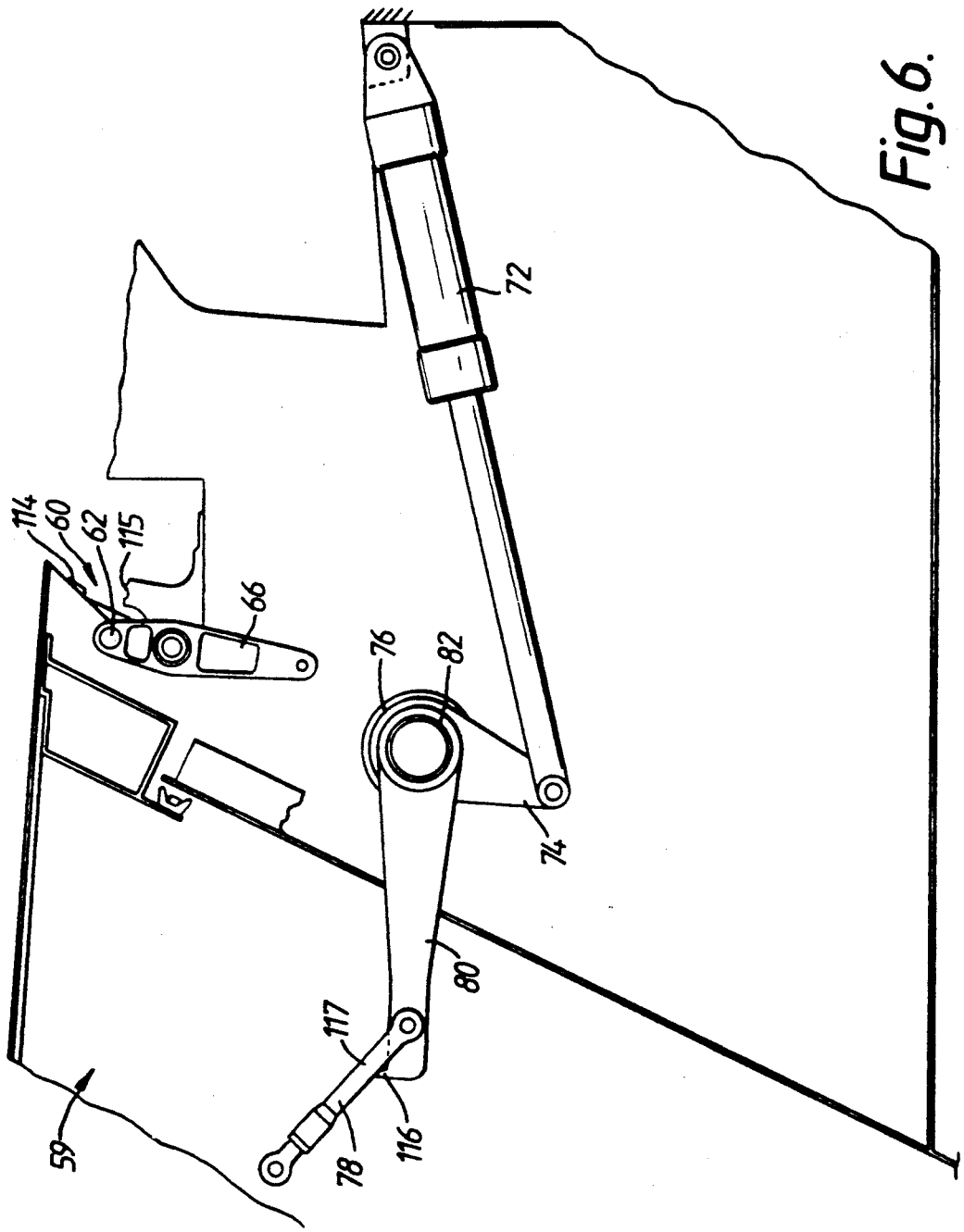

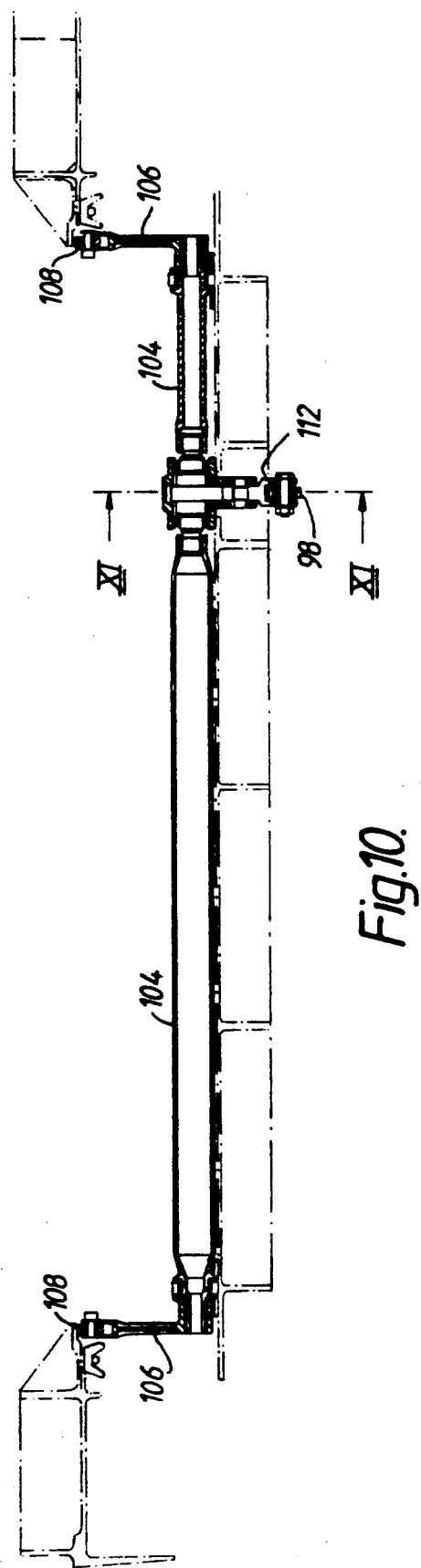
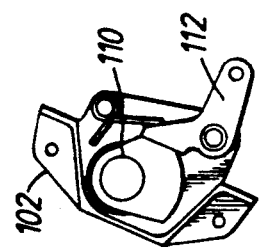
Fig.10.
Fig.11.

CANOPY OR COVER ASSEMBLIES AND PIVOT ARRANGEMENTS

BACKGROUND OF THE INVENTION

This invention relates to an assembly for a canopy or cover element and to pivot arrangements.

In particular, but not exclusively, the invention relates to a cockpit canopy assembly for hingeably mounting a cockpit canopy onto the surrounding cockpit structure. With the arrival of larger canopies and the differences in thermal expansion properties of the canopy and fuselage materials, canopy assemblies need to provide effective sealing between the canopy and the cockpit across a wide range of operating temperatures. Consequently there is a need for a canopy hinge arrangement which is capable of accommodating significant differential expansion between the cockpit and the surrounding fuselage.

SUMMARY OF THE INVENTION

According to one aspect of this invention, there is provided an assembly comprising a canopy or cover element, an aperture, and hinge means for mounting said canopy or panel element for movement about a hinge axis between open and closed positions, said hinge means allowing movement of said hinge axis to allow for differential expansion of said aperture and canopy or cover element.

According to another aspect of this invention there is provided a pivot arrangement for pivotally coupling two members together about a pivot axis, wherein said pivot axis is either free to float or fixed, dependent on the relative angular positions of said two members.

Brief Description of the Drawings

The invention may be performed in various ways and two embodiments thereof will now be described in detail, reference being made to the accompanying drawings, in which:

FIG. 1b is a top perspective view of the rear casting of the assembly of FIG. 1a;

FIG. 2 is a detailed sectional view of the aft part of the assembly of FIG. 1 with the front part taken on the center line and the rear part taken on the right hand hinge of the assembly;

FIG. 4 is a transverse sectional view through the left-hand and right-hand hinges of the assembly of FIG. 1, looking forward;

FIG. 6 is a detailed side view on the rear part of a second embodiment of cockpit canopy assembly in accordance with the invention showing the actuator and associated linkage;

FIG. 10 is a cranked sectional view taken on line X—X of FIG. 7; and

FIG. 11 is a sectional view taken on line XI—XI of FIG. 10.

DETAILED DESCRIPTION OF THE INVENTION

Figure 1A:
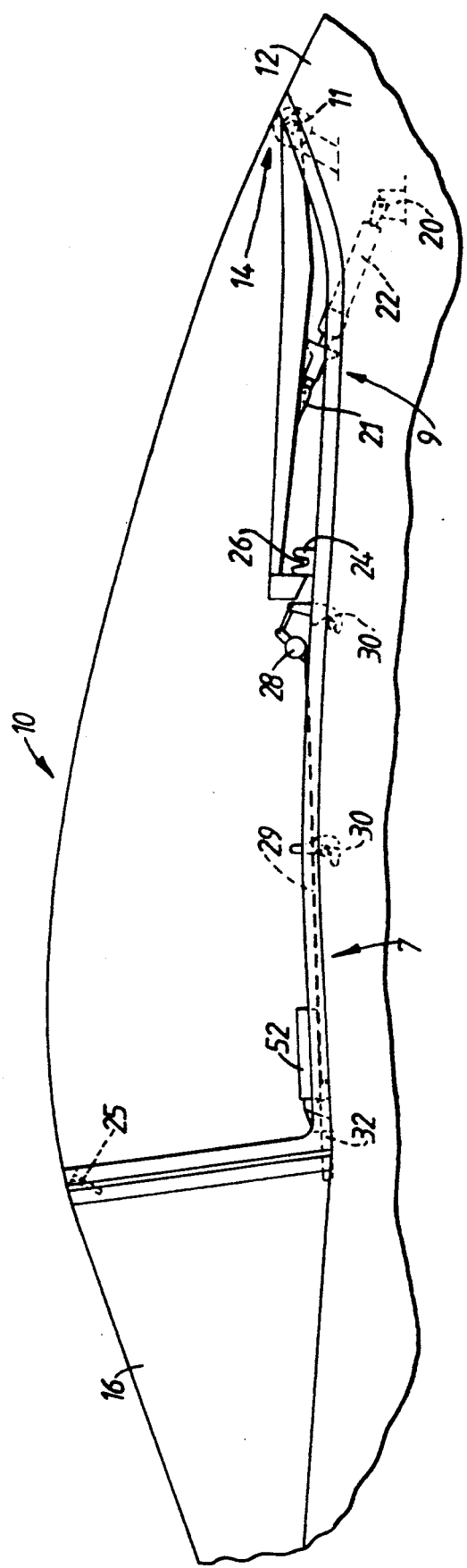
FIG. 1a is a schematic side view of a first embodiment of a canopy assembly in accordance with the invention.
Figure 1B:
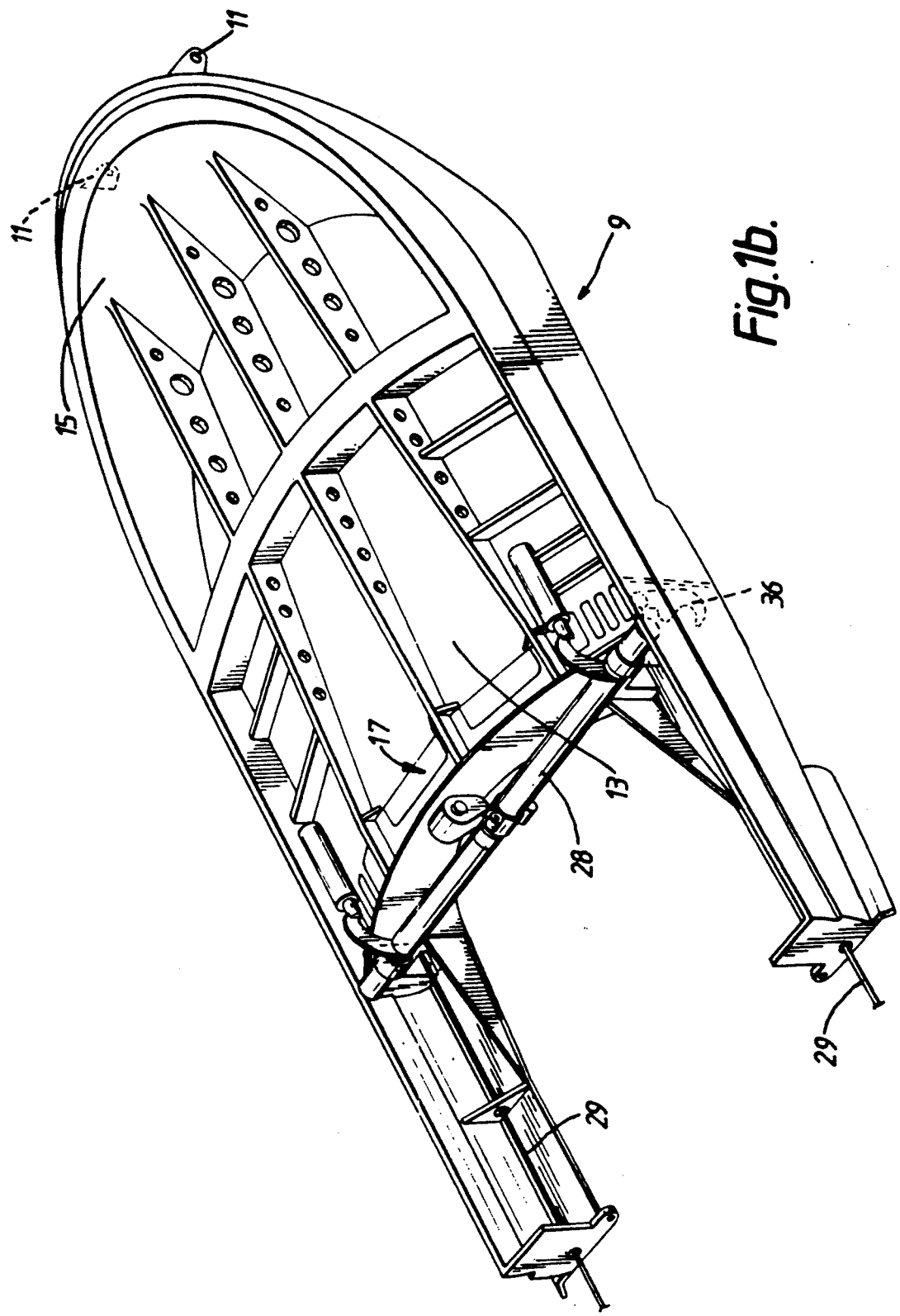

Referring initially to FIGS. 1a and 1b the first embodiment of canopy assembly is intended for a single seat fighter aircraft. The canopy 10 comprises front and rear castings 7 and 9 respectively which are secured together and carry the canopy glass. The canopy 10 is hinged at its rear end to the fuselage 12 by a hinge arrangement 14, and when closed, blends with the forward windscreen 16. The hinge arrangement 14 comprises left and right-hand hinge brackets 11 extending rearwardly from the rear end of the rear casting 9, which cooperate with modified hinge pin arrangements associated with the fuselage structure. As to be described below, the hinge arrangements 14 allow fore and aft shifting of the hinge axis when the canopy is closed to accommodate differential thermal expansion of the canopy and the surrounding fuselage 12.

The rear casting 9 includes a floor 13, a slanted rearward curved wall 15 and a transverse pressure plate 17. The lower edge of the pressure plate carries a seal 19 which seals against a facing surface on the fuselage structure so that the rearward casting acts as a pressure bulkhead between the pressurised cockpit and the unpressurised equipment bay beneath and to the rear of the rear casting 9.

The canopy 10 is opened by a jack 22 connected between an anchorage point 20 on a fixed fuselage structure and a bracket 21 on the underside of the floor 13 of the rear casting. The anchorage point allows limited "float" of the jack 22 relative to the fixed fuselage structure when the canopy is closed, as to be described below.

When closed the canopy 10 is located at the rear end by the hinge arrangements 14 which allow longitudinal float of the rear end. At the midpoint of the canopy a slotted bracket 24 is fixed in the fuselage 12 and receives a roller pin 26 secured to the cross-member 20 to prevent longitudinal movement, of the roller pin—and thus of the canopy—relative to the fuselage. At the front end, the canopy is provided with a spigot 25 which is housed in a recess or slot in the frame of the windscreen 16 which allows limited longitudinal float but prevents lateral movement. Elsewhere, the canopy and panel include associated abutment surfaces (not shown) which also prevent lateral movement.

A transverse torque shaft 28 driven by an electric drive (not shown) spans the canopy and drives via links 29 forward and rearward left and right-hand hooks 30 and left and right-hand shoot bolts 32 to lock the canopy.

Figure 3A:
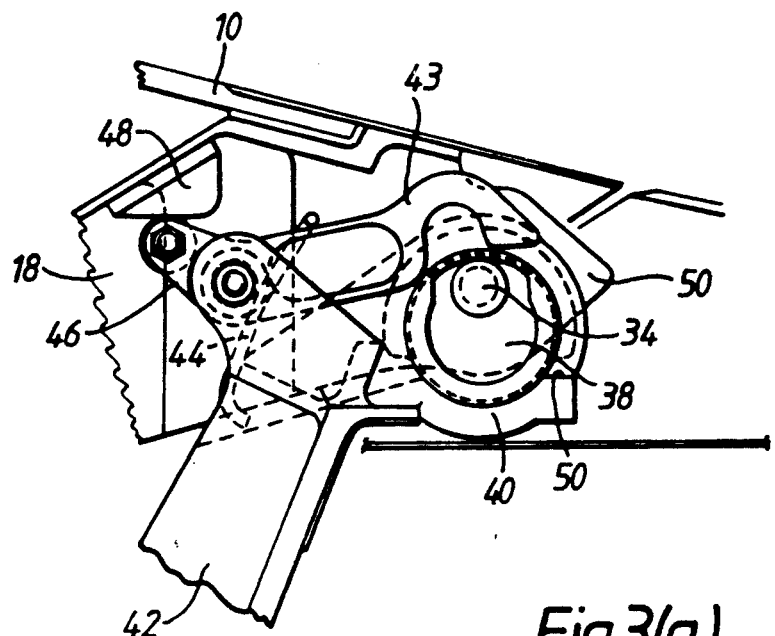
FIGS. 3a and 3b are detail side views looking outboard on the right-hand hinge of the assembly of FIG. 1 when the canopy is closed and open at 30° respectively.
Figure 3B:
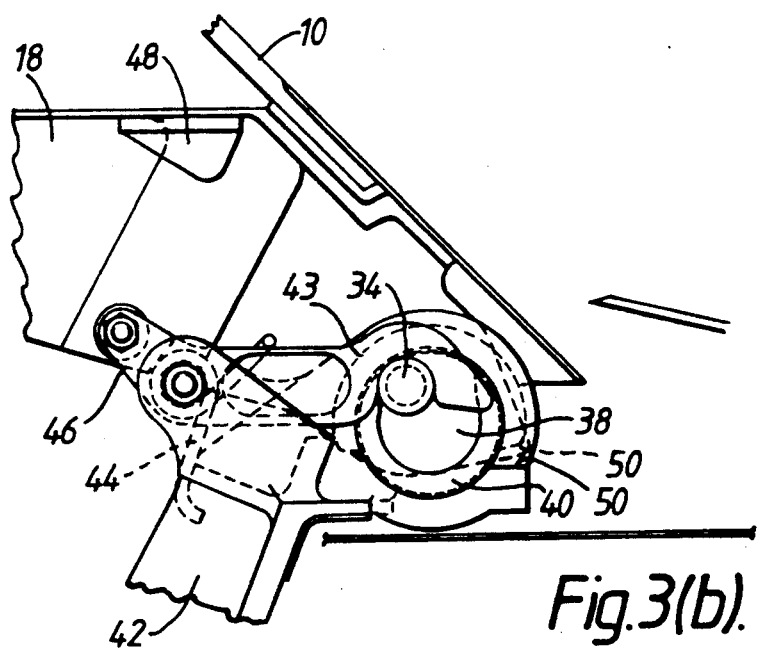

Referring now more particularly to FIGS. 3 and 4, each hinge arrangement 14 comprises a canopy-hinge bolt 34 which is mounted by a bearing 36 to the associated hinge bracket 18 of rear casting 9. To either side of each hinge bracket are mounted eccentric plates 38 which are received in two associated bushes 40 bonded into spaced bores one in each limb of a fork of a canopy mounting bracket 42. The eccentric plates 38 may rotate in the bushes 40 to shift the hinge bolts 34 and thus the hinge axis about which the canopy pivots. The bushes 40 are shaped to limit the arc of travel of the hinge bolts, as can be seen in FIGS. 3a and 3b.

A locking arm 43 is pivotally mounted on each canopy mounting bracket 42 and has a hook portion for locking on to the end of the canopy hinge bolt 34 when the bolt is near its forwardmost position. The locking arm 43 is biassed by a torsion spring 44 towards locking engagement with the hinge bolt 34, and is provided with a cranked release arm 46. The release arm 46 cooperates with an abutment 48 on the canopy hinge bracket 11 yoke 18 so that, when the canopy is closed, the locking arm 43 is disengaged from the hinge bolt 34, thus allowing limited shifting of the hinge axis. But, as the canopy opens, the abutment moves away so the spring 44 urges the locking arm 43 into engagement with the hinge bolt 34 to prevent movement thereof. Referring to FIG. 2, it will be seen that as the jack 22 is extended it will tend to move the hinge bolt 34 to its foremost position, i.e. towards engagement with the locking arm 43. Thus during the initial phase of opening, the canopy is pushed forwardly, before it is raised.

The hinge geometry is such that the portion of the canopy between the hinge brackets 11 passes inside the portion of the spine behind it and occupies an empty space within the fuselage. The intersection profile is relatively flat and also the initial forward movement and subsequent locking on the hinge axis on opening of the canopy ensure that the canopy opens without snagging the adjacent surface of the fuselage. It should also be noted of course that the area adjacent the hinge axis is unpressurised, the rearward canopy casting 9 defining a pressure bulkhead between the pressurised cockpit and the unpressurised fuselage.

The ends of the arms of the canopy hinge brackets 18 have stop surfaces 50 which engage complementary stop surfaces 50 on the canopy mounting bracket 42 when the canopy is raised beyond its normal open position.

When the canopy 10 is ejected, the jack 22 is uncoupled from the canopy hinge yoke 18 and two ejection rockets 52 on the forward part of the canopy (FIG. 1a) are fired. This lifts the canopy into the airstream, so that it is raised beyond the normal open position, whereupon the canopy hinge bracket stops 50 contact the stop surfaces 50 of the canopy mounting bracket thus shearing the hinge bolts 34.

Figure 5A:
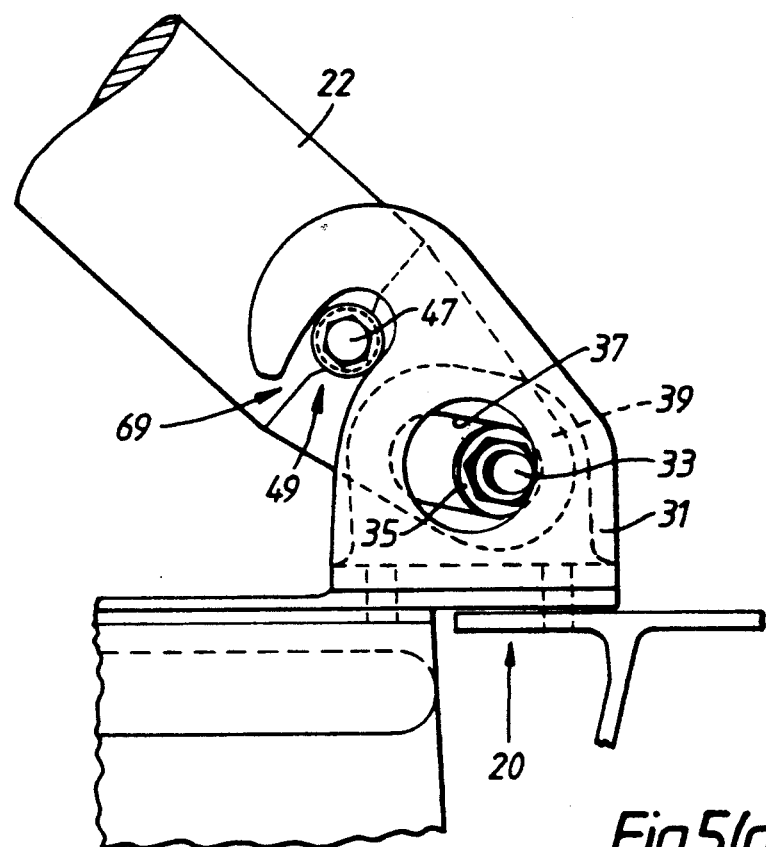
FIGS. 5a, b and c are detailed left hand side, top plan and right hand side views respectively of the pivotal anchorage for the canopy actuation jack.

Referring to FIGS. 5a, b and c, the main jack anchorage point 20 comprises a bracket 31 upstanding from a fixed structural part of the fuselage. The bracket 31 slidably mounts a pivot pin 33 which carries two outer spherical bearings 35 which cooperate with slots 37 in two support plates 39 forming part of the bracket 31. One end of the pivot pin 33 is secured to a torsion bar 41 which is fixed at its lower end and which is rotatably supported at its upper end by a support plate 43. This arrangement means that the pivot pin 33 is capable of resilient swivelling movement about the torsion bar 41, in a plane which corresponds to a jack elevation, in this example, of between 10° and 15°.

The pivot pin 33 includes a central spherical bearing 45 which supports the end of the jack 22. A lateral locking bolt 47 projects from either side of the cylinder of the main jack, forwardly of the pivot pin. The ends of the locking bolt cooperate with arcuate slots 49 in two guide plates integral with the bracket 31.

In use, when the canopy 10 is closed, the jack 22 lies at an elevation of between 10° and 15°, generally aligned with the axes of the slots 37. The pivot pin 33 may slide in the plane defined by the slots, about the axis defined by the torsion bar 41. This allows the end of the jack 22 to float against the resilience imparted by the torsion bar to compensate for differential movement between the jack and the fuselage caused e.g. by thermal expansion.

Figure 5B:
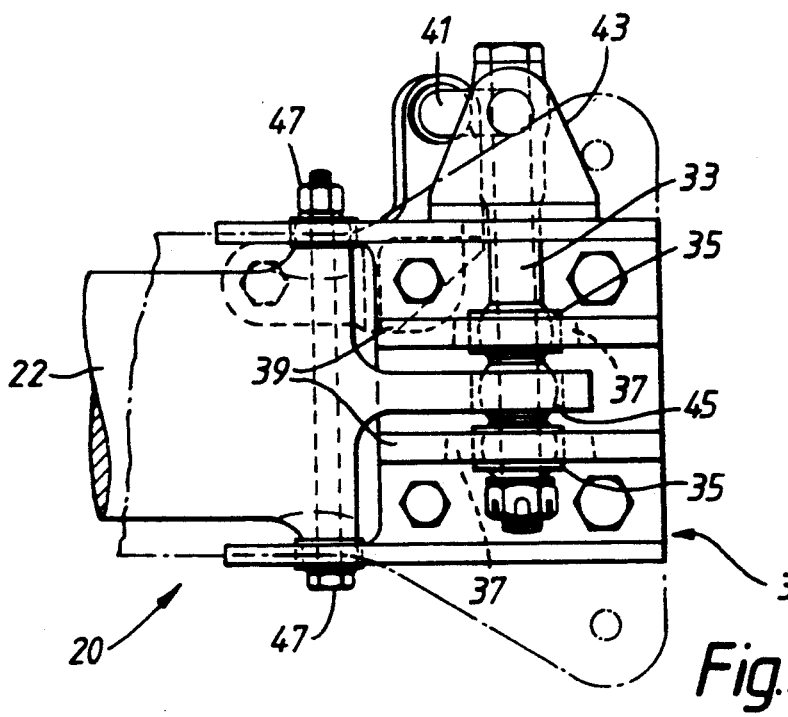
Figure 5C:
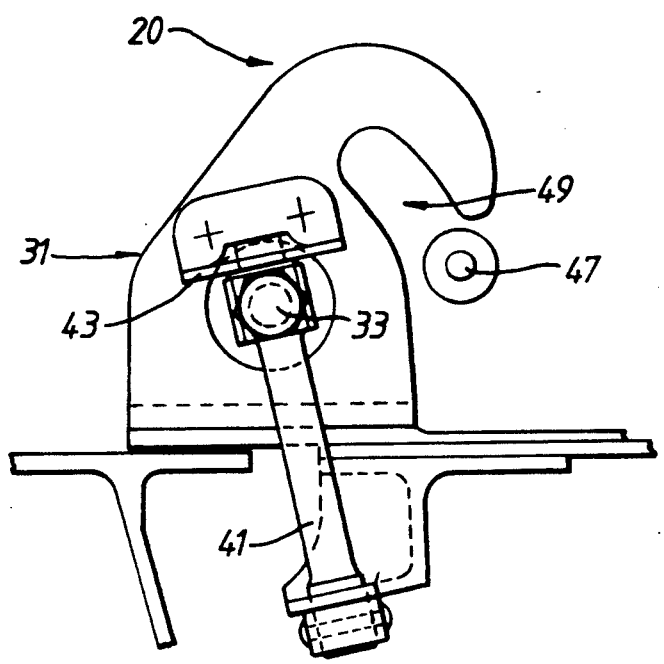
Figure 7:
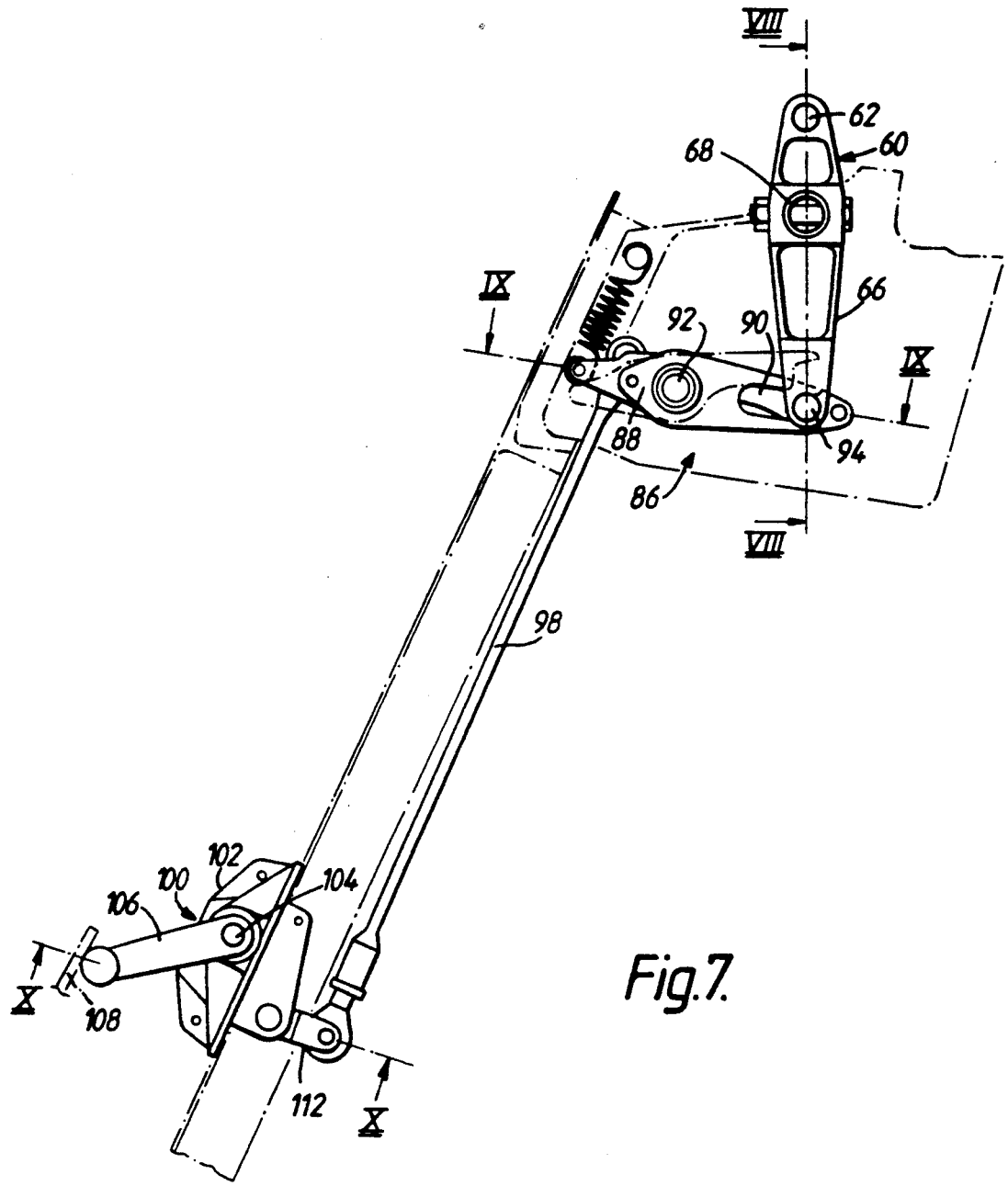
FIG. 7 is a side view of the cockpit canopy assembly of FIG. 6, showing the latch mechanism for latching the floating hinge axis of the assembly when the canopy is moved away from its closed position.
Figure 8:
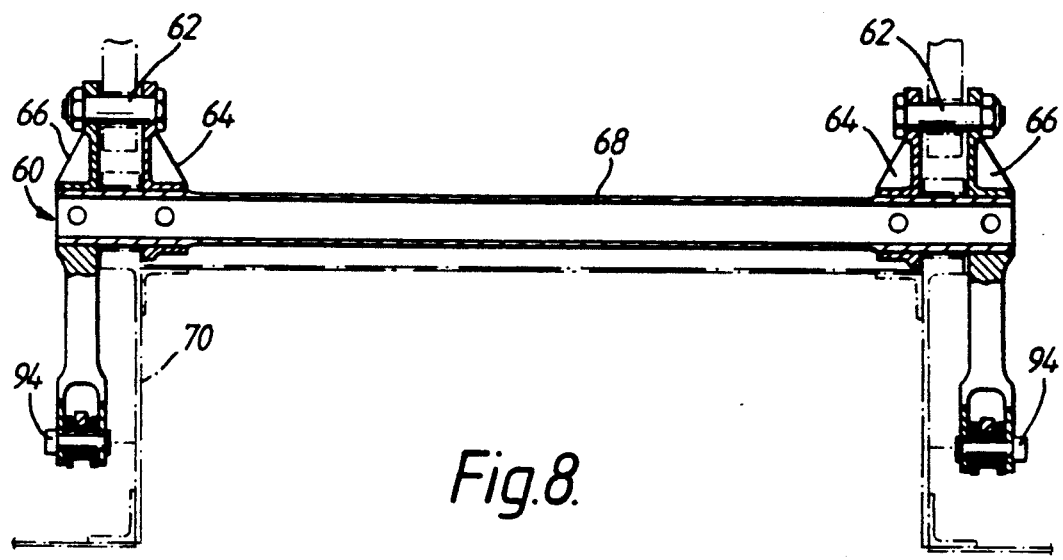
FIG. 8 is a sectional view taken on line VIII—VIII of FIG. 7.
Figure 9:
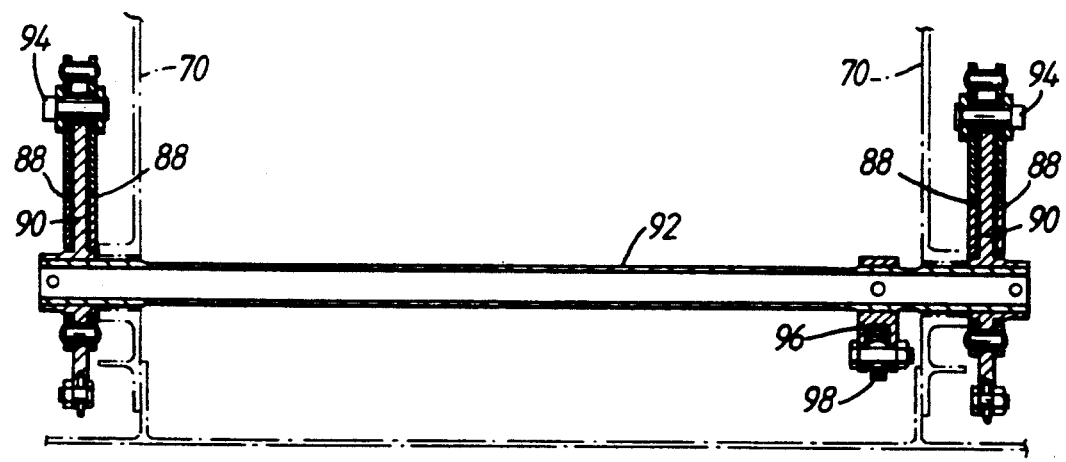
FIG. 9 is a sectional view taken on line IX—IX of FIG. 7.

When the jack is actuated to raise the canopy, the reaction load on initial extension thereof rotates the pivot pin 33 anticlockwise as viewed in FIG. 5b, so that the ends of the locking bolts 47 become aligned with the open end of the arcuate slots 49. As the jack 22 is extended further, its elevation increases so the ends of the locking bolt enter the slots 49, thereby locking the pivot axis of the main jack against floating movement.

Referring now to FIGS. 6 to 11, the second embodiment of canopy allows the hinge axis to move to accommodate differential thermal expansion of the canopy fuselage. The canopy 59 is pivotally mounted at its aft end by means of a hinge arrangement 60 having a left and right hand hinge. Each hinge comprises a hinge bolt 62, an inner link 64, and an outer link 66 pinned to a hinge tube 68 pivotally mounted in bushings in the fixed fuselage structure 70.

As with the previous embodiment the canopy is opened by means of a single hydraulic actuator 72. The actuator is connected between a fixed fuselage structure and a lever 74 attached to the left hand end of an outer torque shaft 76. The actuator and associated linkages are shown in the open position. Links 78 attached to the left and right hand arms of the rear canopy arch (not shown) are connected by levers 80 to an inner torque shaft 82 located concentrically within the outer torque shaft 76. The outer torque shaft 76 is connected to and drives the inner torque shaft 82 at its mid-span.

Referring now specifically to FIGS. 7 to 11, a latch assembly 86, comprising two slotted stop plates 88 one each side of a spring operated latch link 90 is pinned to each end of a rotatable shaft 92, pivotally mounted in bushings in the fixed fuselage structure 70. Each latch assembly 86 engages a latch pin 94 mounted in an extension of the hinge outer link 66. Each latch pin 94 is received within the slot of the associated stop plate 88 thus limiting the extent of float.

An arm 96, pinned to the rotatable shaft 92, is connected by a rod 98 to a de-latch mechanism 100 which comprises a cambox 102, left and right hand torque tubes 104, and an actuator arm 106 attached to the outer end of each torque tube 104. Each actuator arm 106 engages, and is spring biassed against, an associated abutment 108 on the canopy arch such that, as the canopy moves towards its closed position, the torque tubes 104 rotate a cam 110 in the cambox 102 to unlock the latch links 90 by means of a cam follower 112 connected to the lower end of the rod 98, thus allowing the hinge axis to float when the canopy 98 is closed.

The forces involved in opening the canopy tend to move the hinge bolts 62 to their forward position thus allowing the latch links 90, which are spring biassed, to trap the latch pin 94 against the aft end of the slot in the stop plates 88 when the cam 110 is rotated as the canopy moves away from its closed position.

As with the previous embodiment, when the canopy moves beyond its normal open position, during canopy ejection, the actuator is disconnected from the drive mechanism by a suitable quick release mechanism (not shown) and abutment faces 114 on the rear canopy arch hinge lug contact associated abutment faces 115 on the fixed fuselage structure 70 to shear the hinge bolts 62. In addition the links 78 and associated levers 80 incorporate mutual abutment faces 116,117 to ensure fracture and separation of said links.

The invention extends to any inventive combination of features defined or disclosed above.

Further details of the canopy structure described herein are included in our co-pending U.S. applications Ser. Nos. 07/642,212 and 07/642,213, filed on the same data and assigned to the same assignee.

We claim:

1. An assembly comprising:
   a canopy or cover element;
   a body structure including walls defining
   an aperture, and
   hinge means supporting said canopy or cover element for hinging movement between open and closed positions;
   said hinge means comprising a hinge pivot means associated with one of said canopy or cover element and said body structure and rotatably carried by a cooperating element associated with the other of said canopy or cover element or body structure, said hinge pivot means and said cooperating element together defining a hinge axis which is fixed with respect to said canopy or cover element, said hinge pivot means being mounted for limited movement relative to said body structure in a direction transverse to said hinge axis, thereby to allow movement of said hinge axis to accommodate differential expansion of said body structure and said canopy or panel element, wherein said assembly includes support means supporting said hinge pivot means for movement along an arc about an axis spaced from said hinge axis.

2. An assembly according to claim 1, wherein said hinge pivot means comprises hinge bolt means having a generally cylindrical portion eccentric with respect to said hinge axis said cylindrical portion being rotatably received by support means adjacent said aperture.

3. An assembly according to claim 1, wherein said hinge pivot means comprises hinge bolt means attached to or forming part of a link pivoted for movement about a pivotal axis spaced from said hinge axis.

4. An assembly according to claim 1, wherein said hinge means includes cooperating locking means which move into locking engagement to prevent or restrict movement of said hinge axis when said canopy or cover element moves towards its open position.

5. An assembly according to claim 4, wherein said means for preventing comprises a hook arm means spring biassed towards locking engagement with a locking means associated with said hinge means, the canopy or cover element including means for unlocking said hook arm mean from said locking means when the cover element moves towards its open position.

6. An assembly according to claim 5, which includes actuator means for opening said canopy or cover element, said actuator means being arranged such that when opening the canopy or cover element, said actuator tends to cause said locking means and said hook arm means to move towards locking engagement.

7. An assembly according to claim 5, wherein said locking means comprises a shaft or stub means generally concentric with said hinge axis.

8. An assembly according to claim 1, wherein said canopy or cover elememt and said aperture are of elongate form, with the hinge means being provided at or adjacent one end region of said canopy or cover element, and said canopy or cover element and said aperture are each provided intermediate their ends with complementary coupling means which, when coupled, prevent relative movement of the adjacent coupled portions at least in the longitudinal sense.

* * * * *